United States Patent
Pucovsky et al.

(10) Patent No.: US 8,490,409 B2
(45) Date of Patent: Jul. 23, 2013

(54) BLEED AIR TRANSFER TUBE

(75) Inventors: Tania Pucovsky, Mississauga (CA); Paul Aitchison, Hamilton (CA); Brian Healey, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 929 days.

(21) Appl. No.: 12/571,686

(22) Filed: Oct. 1, 2009

(65) Prior Publication Data

US 2011/0079018 A1  Apr. 7, 2011

(51) Int. Cl.
*F02C 7/00*  (2006.01)

(52) U.S. Cl.
USPC .............................................. 60/785; 60/795

(58) Field of Classification Search
USPC ............ 60/782, 785, 795, 796, 799; 285/224, 285/347; 277/500, 505, 507, 579, 580
See application file for complete search history.

(56) References Cited

U.S. PATENT DOCUMENTS

| | | |
|---|---|---|
| 1,854,855 A | 4/1932 | Nakashima |
| 2,913,269 A * | 11/1959 | Hull et al. ................... 277/500 |
| 3,596,934 A | 8/1971 | De Cenzo |
| 3,787,079 A | 1/1974 | Yorke et al. |
| 3,873,138 A | 3/1975 | Griffiths et al. |
| 4,066,281 A | 1/1978 | De Bonis |
| 4,135,742 A | 1/1979 | Anderson |
| 4,163,571 A | 8/1979 | Nash |
| 4,522,433 A | 6/1985 | Valentine |
| 5,106,129 A | 4/1992 | Camacho et al. |
| 6,390,478 B1 | 5/2002 | Simundstand |
| 6,702,300 B1 | 3/2004 | Steinetz et al. |
| 6,709,024 B1 | 3/2004 | Swinford et al. |
| 6,722,664 B2 | 4/2004 | Kleibrink |
| 2005/0056025 A1 * | 3/2005 | Lepretre et al. ................. 60/785 |

FOREIGN PATENT DOCUMENTS

| | | |
|---|---|---|
| GB | 638283 | 6/1950 |
| WO | 98/46861 | 10/1998 |

* cited by examiner

*Primary Examiner* — Phutthiwat Wongwian
*Assistant Examiner* — Scott Walthour
(74) *Attorney, Agent, or Firm* — Norton Rose Fulbright Canada LLP

(57) ABSTRACT

A fluid-conveying device including an inner tubular member with a circumferential end portion, a non-elastomeric ring received in a depression of the end portion, and an outer tubular member. The ring has a peripheral surface with a rounded contour defined along a longitudinal direction configured to remain out of the depression to engage the outer tubular member and facilitate sealing thereof.

20 Claims, 8 Drawing Sheets

BLEED AIR TRANSFER TUBE

TECHNICAL FIELD

The application relates generally to gas turbine engines and, more particularly, to the bleed air system of a gas turbine engine and to fluid transfer tubes used therein.

BACKGROUND

Gas turbine engine bleed air systems are typically used to bleed air from a compressor section of the engine, and to further transfer this bleed air to other parts of the engine or aircraft for further usage. It is desirable to minimize leakage in bleed air conveying components. However, when subjected to vibratory loads, angular deflections, radial deflections, high temperatures and/or differential thermal growth, the fluid transfer tube assemblies in a bleed system may become worn, unsealed and/or may begin to leak. Elastomeric seals are generally not for use in a high temperature environment, because they may lose their shape and become deformed during use, which may lead to the transfer tube assembly becoming unsealed. Typical seals in gas turbine engine bleed systems are therefore generally metallic and energized through the pressurized air which maintains the seal in place. However, when subjected to angular deflections, known arrangements might lead to leaking. Hence, opportunities exist for improvement.

SUMMARY

In one aspect, there is provided a bleed air system for directing bleed air from a compressor section of a gas turbine engine, the bleed air system comprising a cylindrical adaptor in fluid communication with the compressor section, the adaptor having an inner surface, a cylindrical conduit defined by an outer cylindrical wall having two opposed open ends for permitting fluid passage therethrough, the outer cylindrical wall having a pair of adjacent annular flanges extending radially outwardly in proximity of a respective one of the open ends, the pair of annular flanges defining a circumferential groove between opposed annular side walls thereof and being circumscribed by the cylindrical adaptor, and a non-elastomeric ring received in the circumferential groove, the ring having two opposed annular walls located adjacent a respective one of the two side walls of the flanges, the ring having a radial thickness greater than a depth of the groove such that an outer peripheral portion of the ring protrudes radially from the groove around an entire circumference thereof, the outer peripheral portion having an outer peripheral surface abutting the inner surface of the adaptor and maintaining the adaptor spaced apart from the conduit in proximity of the ring while sealing the conduit within the adaptor, the outer peripheral surface having a curved profile extending between the opposed annular walls along a longitudinal direction configured to provide continuous abutment of the outer peripheral surface on the inner surface irrespective of angular displacement of the cylindrical adaptor relative to the cylindrical conduit, the ring being spaced apart from an inner circumferential surface defining a bottom of the groove along at least a portion of the circumference of the groove such as to create a radial gap permitting relative movement between the ring and the cylindrical conduit.

In another aspect, there is provided a fluid-conveying device comprising an inner tubular member having two opposed open ends, at least one circumferential portion of the inner tubular member adjacent one of the open ends having an outer annular surface and an annular depression defined therein by two opposed annular side walls extending radially inwardly from the outer surface and interconnected by a circumferential surface spaced radially inwardly from the outer annular surface, a non-elastomeric ring occupying an annular portion of the depression, the ring having an inner diameter greater than a first outer diameter defined by the circumferential surface and smaller than a second outer diameter defined by the outer annular surface near the depression such as to enable radial displacement of the ring within the annular depression while maintaining an inner annular portion of the ring inside the depression, the ring having opposed annular ring walls located adjacent a respective one of the side walls defining the depression and an outer peripheral surface with a rounded contour extending between the annular ring walls along a longitudinal direction, the ring defining an outer diameter greater than the second outer diameter, and an outer tubular member having an inner surface abutting the outer peripheral surface of the ring, the outer tubular member having an inner diameter at least substantially equal to the outer diameter of the ring and being sealingly engaged thereto, the ring maintaining the outer tubular member distanced from the inner tubular member.

In a further aspect, there is provided a bleed air transfer tube assembly for a gas turbine engine, the tube assembly comprising an inner tubular member having opposed open ends and at least one annular groove defined in an outer surface thereof in proximity of a respective one of the open ends, an outer tubular member surrounding at least a portion of the inner tubular member where the groove is defined, the outer and inner tubular members being relatively sized such as to allow a range of relative angular displacement therebetween, and a non-elastomeric ring received within the annular groove and having opposed radial surfaces extending adjacent radial walls of the annular groove, an outer surface defining a curve along a longitudinal direction between the opposed radial surfaces and in sealed contact with an inner wall of the outer tubular member, and an inner surface extending within the groove, the inner surface of the ring being spaced apart from a bottom of the groove around at least part of its circumference throughout the range of relative angular displacement, the ring having a radial thickness larger than a radial depth of the groove, such that the outer surface of the ring is in continuous contact with the inner wall of the outer tubular member and prevents contact between the inner and outer tubular members in proximity of the groove throughout the range of relative angular displacement.

DESCRIPTION OF THE DRAWINGS

Reference is now made to the accompanying figures in which.

DETAILED DESCRIPTION

Figure 1:
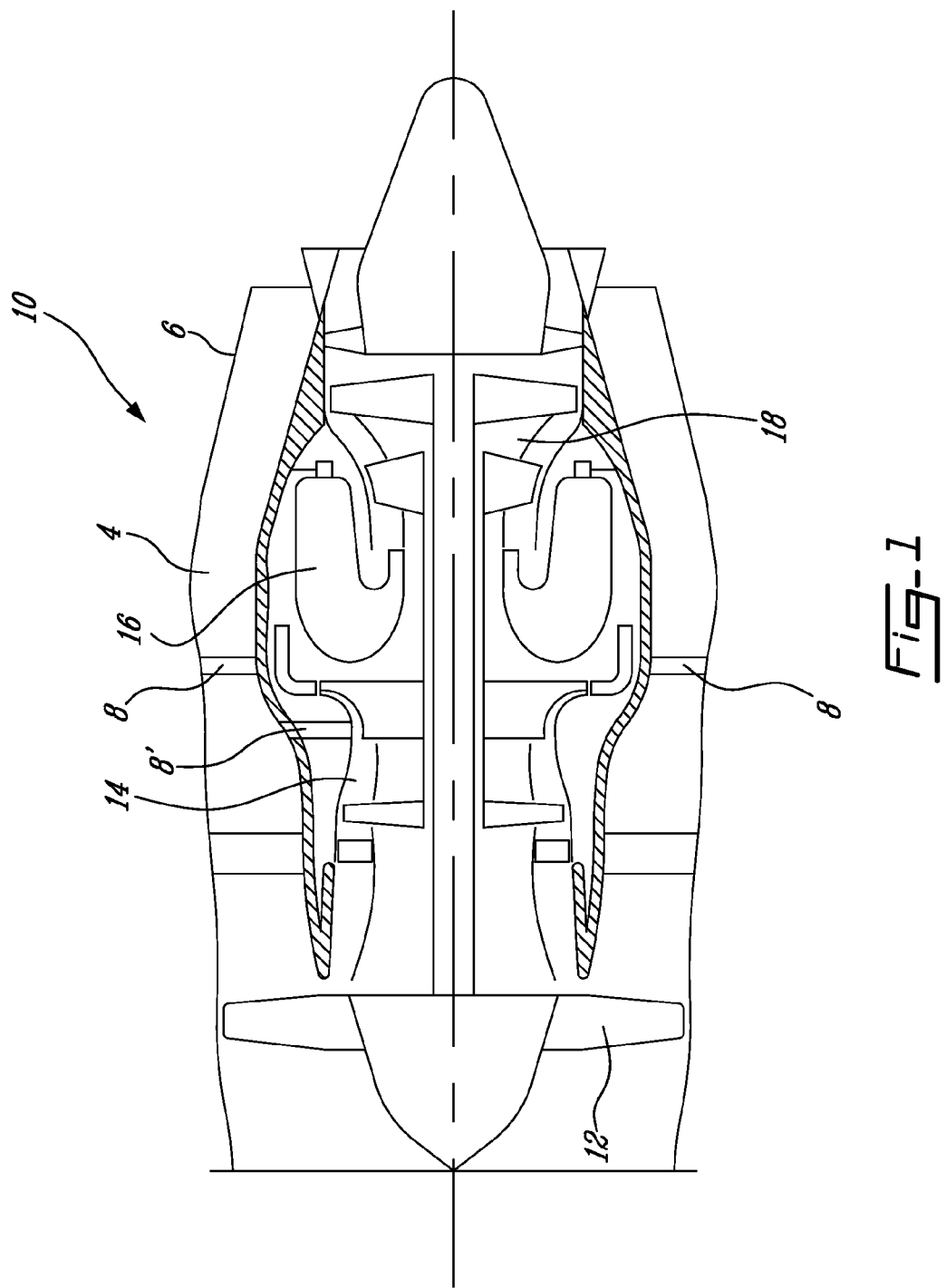
FIG. 1 is a schematic side cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, compressor section 14, combustor 16 and turbine section 18 are surrounded by an outer bypass duct structure 6 which defines a bypass air cavity 4 therearound.

Figure 2:
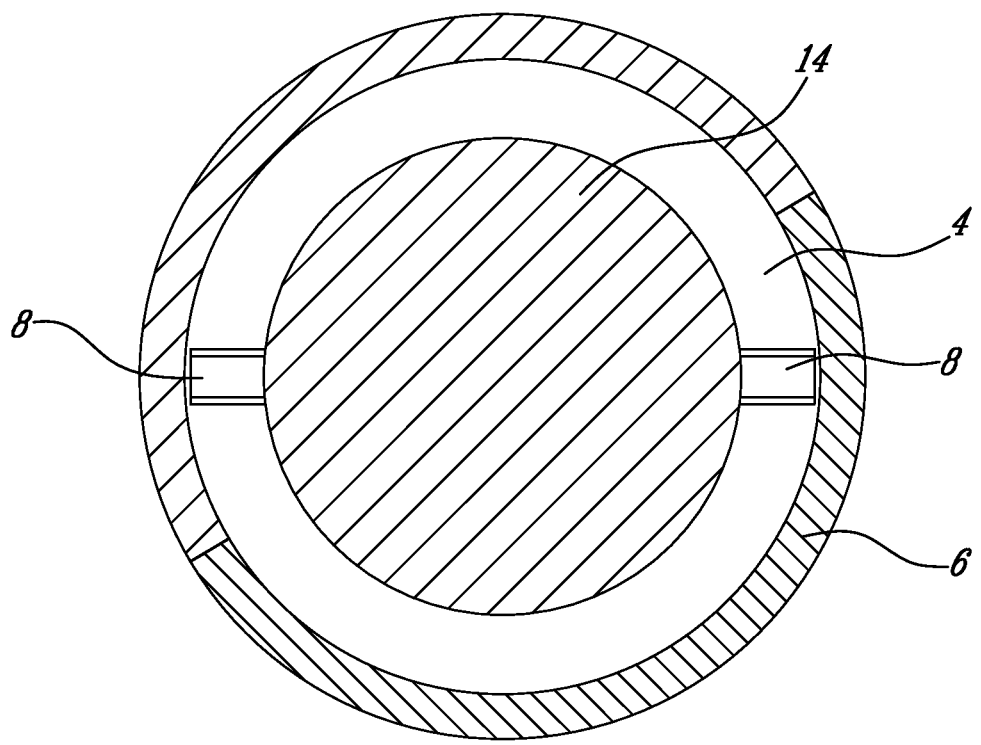
FIG. 2 is a schematic front cross-sectional view of the gas turbine engine of FIG. 1.

Referring to FIGS. 1 and 2, the gas turbine engine also comprises a bleed air system which bleeds air from the compressor section 14, and which includes two transfer tube assemblies 8. The transfer tube assembly 8 is used to direct bleed air from one location to another. The transfer tube assemblies 8 extend through the bypass air cavity 4, between the compressor section 14 and the outer bypass duct structure 6. In other embodiments, the transfer tube assembly can be used in various other stages of bleed, for example in bleeding air from the compressor section 14 to the bypass air cavity 4, as shown by 8' (FIG. 1).

Figure 4:
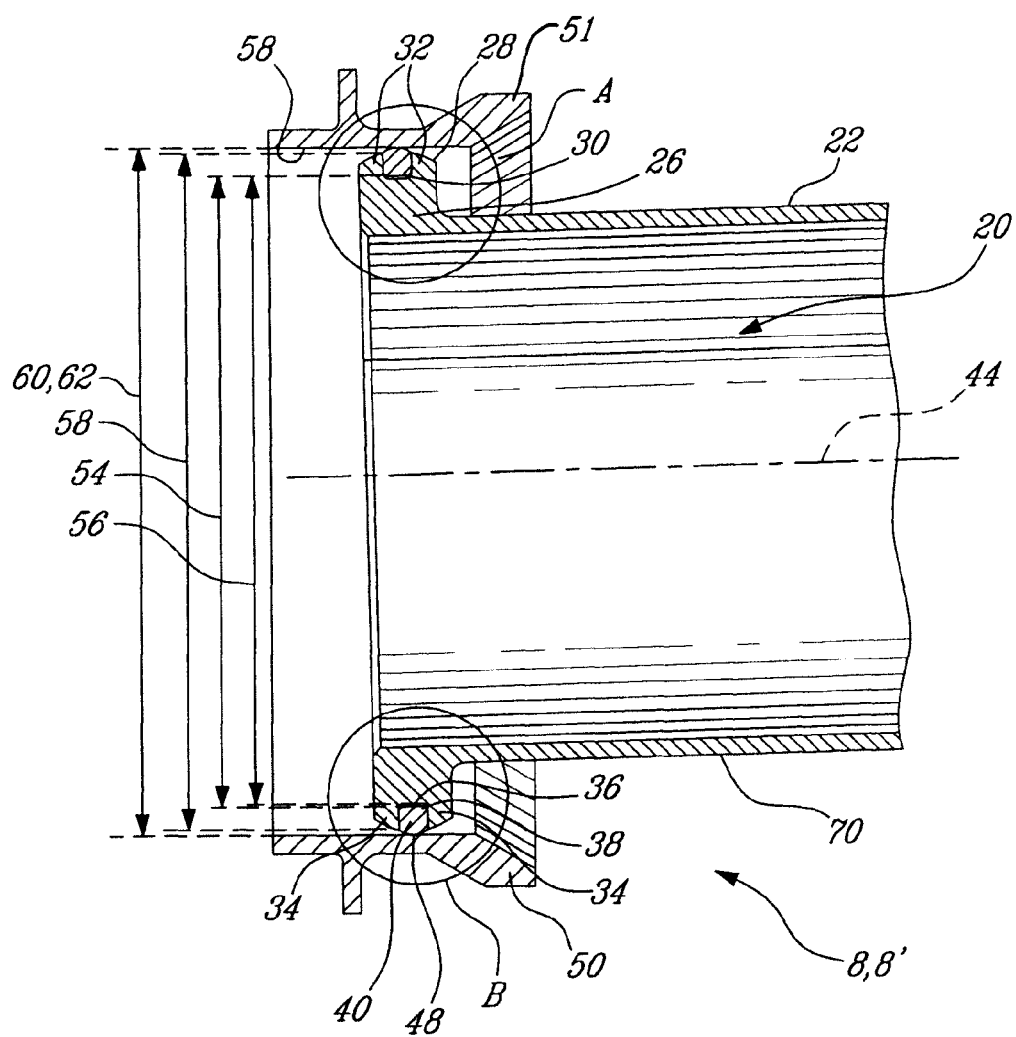
FIG. 4 is a cross-sectional view of one end of the transfer tube assembly of FIG. 3.

Referring to FIG. 4, the transfer tube assembly 8, 8' comprises three main components, a cylindrical conduit or inner tubular member 20, a cylindrical adaptor or outer tubular member 50 and a single non-elastomeric ring 40 sealing the inner tubular member 20 to the outer tubular member 50. The inner tubular member 20 and the outer tubular member 50 undergo a range of relative axial and angular deflections, due to thermal growth variations and to vibration loads. The ring 40 provides a sealed contact between the tubular members 20 and 50, while accommodating such relative motions therebetween.

Figure 3:
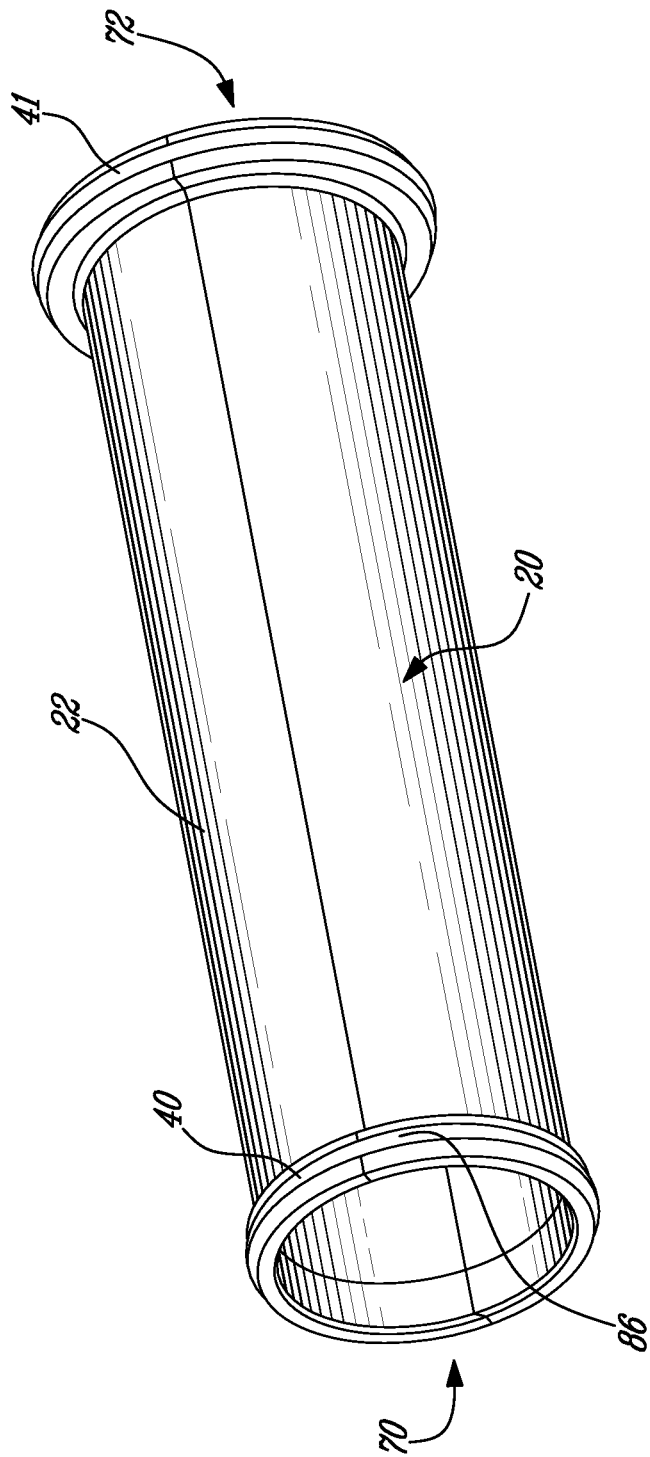
FIG. 3 is a perspective view of an inner tubular member of a transfer tube assembly which can be used in a gas turbine engine such as shown in FIG. 1.

As seen in FIG. 3, the inner tubular member 20 comprises a cylindrical wall 22 defining two opposed open ends 70, 72 for permitting fluid passage therethrough. In the particular embodiment shown, both ends 70, 72 of the inner tubular member 20 are relatively similar, with the ring 40 sealing one end 70 of the inner tubular member 20 to the outer tubular member 50 and a second ring 41, similar to ring 40, sealing the end 72 of the inner tubular member 20 to a second outer tubular member (not shown), similar to outer tubular member 50. Only the assembly of the first ring 40, outer tubular member 50 and inner tubular member 20 at end 70 will be herein described and it is understood that the second end 72 of the inner tubular member 20, second outer tubular member (not shown) and second ring 41 are similarly configured. In another embodiment, the second end 72 of the inner tubular member 20 may be connected to another component of the gas turbine engine through another type of connection, e.g. a rigid connection.

As seen in FIG. 4, the inner tubular member 20 comprises at least one circumferential portion 26 located in proximity of the end 70 and extending radially outwards from a remainder of the inner tubular member 20, i.e. the circumferential portion 26 defines has a larger outer diameter than that of a remainder of the inner tubular member 20. This circumferential portion 26 has an outer annular surface 28 having an annular depression or circumferential groove or depression 30 defined therein. In the embodiment shown, the circumferential portion 26 comprises two adjacent annular flanges 32 interconnected by a circumferential surface 36 and extending radially outwardly therefrom, such that the groove 30 is defined between respective opposed annular side walls 34 of the flanges 32, with a bottom of the groove 30 being defined by the circumferential surface 36. In another embodiment which is not shown, the circumferential portion 26 may have an outer diameter similar or substantially similar to that of the outer diameter of the remainder of the inner tubular member 20, i.e. the thickness and/or configuration of the cylindrical wall 22 may be such that the circumferential portion 26 does not significantly extend radially from a remainder of the inner tubular member 20.

Still referring to FIG. 4, the ring 40 occupies an annular portion of the groove 30. The ring 40 has an inner diameter 54 which is greater than a first outer diameter 56 of the inner tubular member 20 defined along the bottom of the groove 30, by the circumferential surface 36. As such, the ring 40 is spaced apart from the circumferential surface 36 of the groove 30 along at least a portion of the circumference thereof, therefore creating a variable radial gap 38 between the ring 40 and the circumferential surface 36 (also shown in FIG. 6). The gap 38 allows for relative displacement of the ring 40 inside the groove 30. The inner diameter 54 of the ring is also smaller than a second outer diameter 58 of the inner tubular member 20 defined by the outer annular surface 28 of the circumferential portion 26 This prevents the ring 40 from exiting the groove 30 during use.

Figure 5:
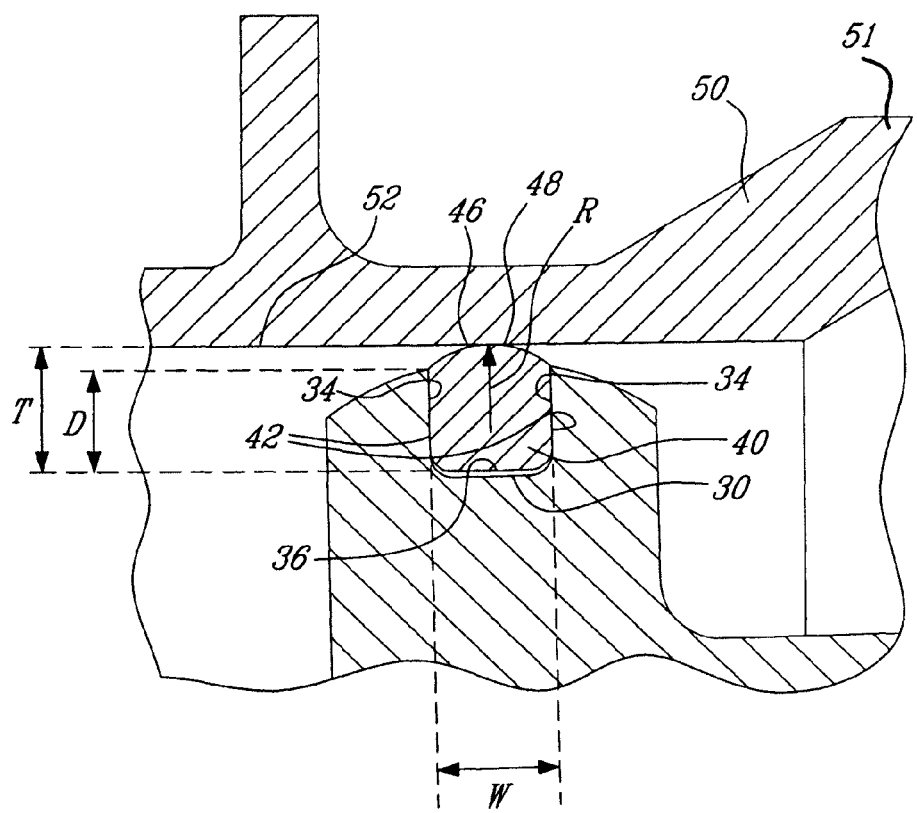
FIG. 5 is an enlarged view of detail A of FIG. 4.

As seen in FIG. 5, the ring 40 has a longitudinal width W, i.e. the dimension measured along longitudinal axis 44 (see FIG. 4), which is slightly smaller than the distance between the side walls 34, so that the two opposed radial annular side walls 42 of the ring 40 are located adjacent a respective one of the annular side walls 34 and may each abut a respective one of the annular side walls 34. The ring 40 is in sealing contact with at least one of the side walls 34, while being free to move relatively thereto, such as to allow movement of the ring 40 within the groove 30 while preventing fluid leakage between the ring 40 and the inner tubular member 20.

The ring 40 has a radial thickness T which is greater than a depth D of the groove 30, to ensure that the ring 40 has an outer peripheral portion 46 protruding from the groove 30 along an entire circumference thereof, regardless of the position of the ring 40 inside the groove 30.

In the embodiment shown, the ring 40 is a monolithic, one-piece ring (See FIG. 3) and is split, i.e. it has a circumferential gap 86 extending along part of a circumference thereof. This gap 86 allows for radial compression of the ring 40 and for easy assembly of the ring 40 inside the groove 30. The ring 40 is made of a stiff material which is resistant to deformation. The ring 40 therefore mechanically seals the inner tubular member 20 and the outer tubular member 50, such that even under high pressure, the stiffness of the ring allows the ring to maintain its shape. This prevents the ring 40 from collapsing into the groove 30, thereby preventing the inner tubular member 20 from contacting the outer tubular member 50. The ring is made of a material which minimizes the risk of the transfer tube assembly 8, 8' becoming unsealed when exposed to high temperatures, and which is able to accommodate for thermal growth between the tubular members. In a particular embodiment, the material from which the ring is formed is able to resist to temperatures of at least 1000° F. In one embodiment, the non-elastomeric ring 40 is made of a suitable high temperature metal such as a nickel alloy, for example AMS 5671. In another embodiment, the ring 40 is made of a suitable type of ceramic. In a particular embodiment, the ring 40, which may be made of a nickel alloy or of another suitable material, is coated on its outer peripheral surface 48 with a thin layer (e.g. 0.0007-0.0013 inches) of an anti-galling compound, for additional wear protection.

Referring back to FIG. 4, the outer tubular member 50 surrounds or circumscribes the ring 40 and at least a portion of the inner tubular member 20 where the groove 30 is defined. The outer tubular member 50 has an inner surface 52 defining an inner diameter 62 substantially equal to the outer diameter 60 of the outer peripheral surface 48 of the ring 40. The inner surface 52 therefore abuts the outer peripheral surface 48 to form a sealed connection. This prevents fluid leakage between the outer tubular member 50 and the ring 40. As seen in FIG. 4, the outer tubular member 50 includes a radially outwardly extending flange 51 on an open end thereof which receives the inner tubular member therein.

As mentioned above, the ring 40 has an outer peripheral portion 46 which protrudes radially from the groove 30 along an entire circumference thereof. The ring 40 is therefore the only connection between the inner tubular member 20 and the outer tubular member 50, and it maintains the inner tubular member 20 and the outer tubular member 50 spaced apart. Therefore, the risk of inner tubular member 20 directly contacting the outer tubular member 50 is minimized, which ensures that contact is limited to the surfaces designed to withstand wear, thus reducing wear damage of the tubular members 20, 50.

Figure 6:
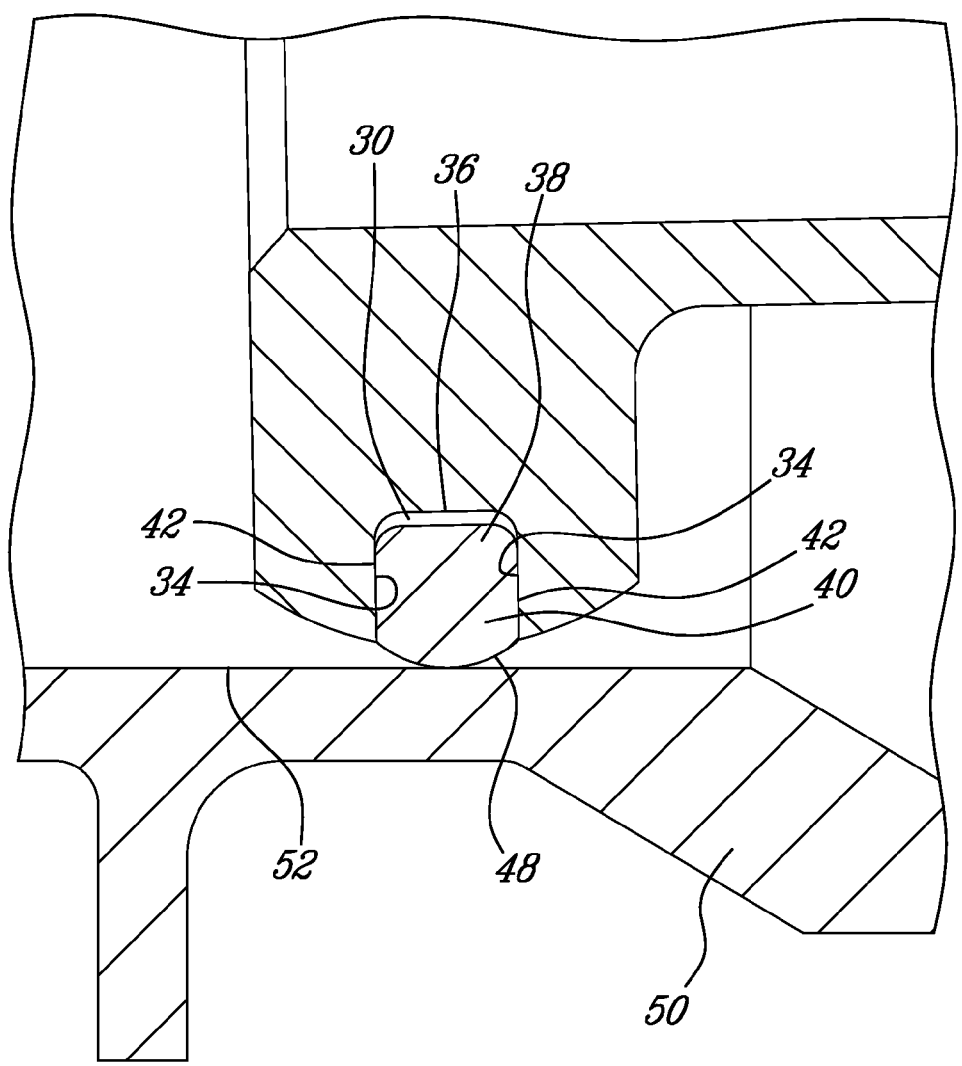
FIG. 6 is an enlarged view of detail B of FIG. 4.

In use, the inner tubular member 20 and the outer tubular member 50 are subjected to relative axial and radial deflections, due to vibrations and thermal growth variations, as well as sizing and positioning manufacturing tolerances. For these reasons, the inner tubular member 20 and outer tubular member 50 are relatively sized to allow a range of relative angular displacement therebetween. As seen in FIGS. 5 and 6, the outer peripheral surface 48 of the ring 40 has a curved profile or rounded contour, which extends between the opposed radial annular side walls 42 along the longitudinal direction 44. When the tubular members 20, 50 are subjected to relative angular deflections, the rounded contour of the outer peripheral surface 48 of the ring 40 allows the inner tubular member 20 to roll, by way of the ring 40, along the inner surface 52 of the outer tubular member 50, while maintaining the ring 40 abutted to the outer tubular member 50. The curved profile is configured to provide continuous abutment of the outer peripheral surface 48 on the inner surface 52 irrespective of angular displacement of the cylindrical adaptor relative to the cylindrical conduit. The rounded contour decreases the wear on the outer tubular member 50 and provides for uniform wear on the outer peripheral surface 48 of the ring. In this particular embodiment, the rounded contour of the outer peripheral surface 48 is only slightly curved. The curved profile of the outer peripheral surface 48 defines a radius of curvature R (see FIG. 5) and the ratio between the radius of curvature and the outer diameter 60 of the ring 40 is within the range of 0.02 to 0.08.

Furthermore, the gap 38 between the ring 40 and the circumferential surface 36 of the groove 30 allows for relative displacement of the ring 40 inside the groove 30. When subjected to certain axial or angular deflections, the ring 40 may therefore completely fill a portion of the groove 30 at a first angular position while still protruding therefrom, while at another angular position, the gap 38 is present between the ring 40 and the circumferential surface 36, with a greater portion of the ring protruding from the groove 30. When subjected to different axial or angular deflections, the gap 38 may be located at a different angular position along the circumference of the groove 30. This provides the transfer tube assembly 8, 8' with a greater degree of flexibility when subjected to axial or angular loads, which decreases the wear caused to the assembly 8, 8'.

The transfer tube assembly 8, 8' reduces the wear on the inner tubular member 20 and the outer tubular member 50 by using the ring 40 as the sole contact between these two components. In addition, the transfer tube assembly 8, 8' allows for the sealed connection to be maintained when subjected to axial or angular deflections, vibration loads or when exposed to high temperatures.

Figure 7:
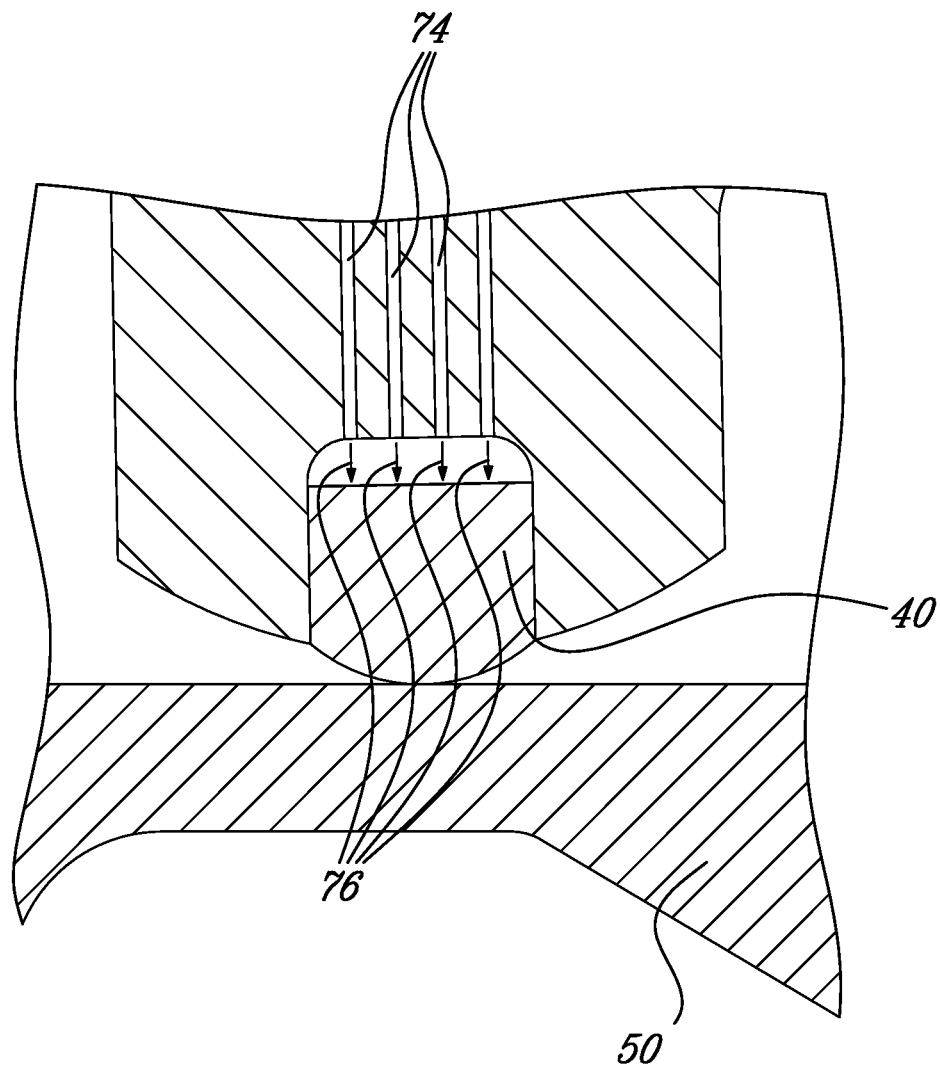
FIG. 7 is a cross-sectional view of part of a transfer tube assembly according to an alternate embodiment.

In an alternate embodiment shown in FIG. 7, the circumferential surface 36 at the bottom of the groove 30 comprises holes 74 defined therein in fluid communication with a source of pressurized air 76. This pressurized air 76 may be bleed air or may be additional air from the compressor. The pressurized air 76 pressurizes the groove 30 such as to press the ring 40 against the outer tubular member 50, in order to improve the sealing connection therebetween.

Figure 8:
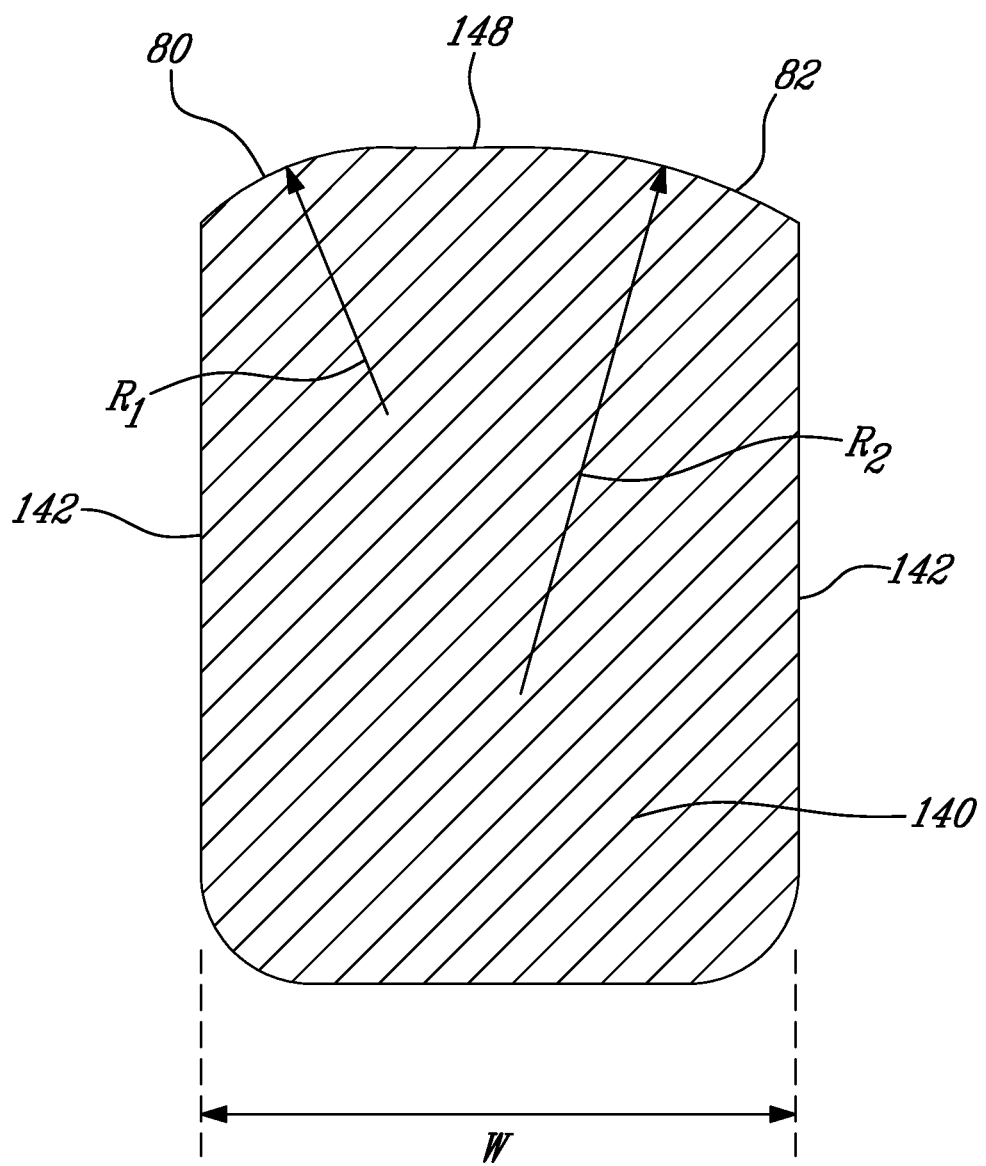
FIG. 8 is a cross-sectional view of part of a transfer tube assembly according to another alternate embodiment.

In another alternate embodiment shown in FIG. 8, the outer peripheral surface 148 of the ring 140 has a curved profile or rounded contour which includes two curves 80, 82, in side by side relationship along a longitudinal direction between the opposed annular walls 142 of the ring 140, with each curve 80, 82 having a respective different radius of curvature R1, R2. Such a contour provides for additional rolling capability of the inner tubular member 20 on the outer tubular member 50, by way of the ring 140, thereby further limiting wear and reinforcing the sealing therein. In a particular embodiment, the two different profiles may be defined along portions of the cross-section of the ring have different widths and/or heights from one another. In another embodiment (not shown), the outer peripheral surface of the ring may have a curved profile or rounded contour with more than two distinct curves.

The above description is meant to be exemplary only, and one skilled in the art will recognize that changes may be made to the embodiments described without departing from the scope of the invention disclosed. For example, although the transfer tube assembly 8, 8' is described as being used in a gas turbine engine bleed air system, the transfer tube assembly could also be used in any type of system where fluid is transferred by pipe or tube. Still other modifications which fall within the scope of the present invention will be apparent to those skilled in the art, in light of a review of this disclosure, and such modifications are intended to fall within the appended claims.

The invention claimed is:

1. A bleed air system for directing bleed air from a compressor section of a gas turbine engine, the bleed air system comprising:
   a cylindrical adaptor in fluid communication with the compressor section, the adaptor having an inner surface;
   a cylindrical conduit defined by an outer cylindrical wall having two opposed open ends for permitting fluid passage therethrough, the outer cylindrical wall having a pair of adjacent annular flanges extending radially outwardly in proximity of a respective one of the open ends, the pair of annular flanges defining a circumferential groove between opposed annular side walls thereof and being circumscribed by the cylindrical adaptor; and
   a non-elastomeric ring received in the circumferential groove, the ring having two opposed annular walls located adjacent a respective one of the two side walls of the flanges, the ring having a radial thickness greater than a depth of the groove such that an outer peripheral portion of the ring protrudes radially from the groove around an entire circumference thereof, the outer peripheral portion having an outer peripheral surface abutting the inner surface of the adaptor and maintaining the adaptor spaced apart from the conduit in proximity of the ring while sealing the conduit within the adaptor, the outer peripheral surface having a curved profile extending between the opposed annular walls along a longitudinal direction configured to provide continuous abutment of the outer peripheral surface on the inner surface irrespective of angular displacement of the cylindrical adaptor relative to the cylindrical conduit, the ring being spaced apart from an inner circumferential surface defining a bottom of the groove along at least a portion of the circumference of the groove such as to create a radial gap permitting relative movement between the ring and the cylindrical conduit.

2. The bleed air system as defined in claim 1, wherein the ring has a circumferential gap extending along part of a circumference thereof, the circumferential gap allowing radial compression of the ring.

3. The bleed air system as defined in claim 1, wherein the circumferential surface of the groove has holes defined therein in fluid communication with a source of pressurized air to pressurize the gap.

4. The bleed air system as defined in claim 1, wherein the curved profile includes two curves with different radiuses of curvature positioned side by side along the longitudinal direction between the opposed annular walls.

5. The bleed air system as defined in claim 1, wherein the ring is made of a nickel alloy.

6. The bleed air system as defined in claim 1, wherein the outer peripheral surface of the ring includes a layer of anti-galling compound.

7. The bleed air system as defined in claim 1, wherein the curved profile of the ring defines a radius of curvature, and a ratio between the radius of curvature and an outer diameter of the ring is within the range of 0.2 to 0.8.

8. The bleed air system as defined in claim 1, wherein the ring is monolithic.

9. A fluid-conveying device comprising:
an inner tubular member having two opposed open ends, at least one circumferential portion of the inner tubular member adjacent one of the open ends having an outer annular surface and an annular depression defined therein by two opposed annular side walls extending radially inwardly from the outer surface and interconnected by a circumferential surface spaced radially inwardly from the outer annular surface;
a non-elastomeric ring occupying an annular portion of the depression, the ring having an inner diameter greater than a first outer diameter defined by the circumferential surface and smaller than a second outer diameter defined by the outer annular surface near the depression such as to enable radial displacement of the ring within the annular depression while maintaining an inner annular portion of the ring inside the depression, the ring having opposed annular ring walls located adjacent a respective one of the side walls defining the depression and an outer peripheral surface with a rounded contour extending between the annular ring walls along a longitudinal direction, the ring defining an outer diameter greater than the second outer diameter; and
an outer tubular member having an inner surface abutting the outer peripheral surface of the ring, the outer tubular member having an inner diameter at least substantially equal to the outer diameter of the ring and being sealingly engaged thereto, the ring maintaining the outer tubular member distanced from the inner tubular member, the outer tubular member having a radially outwardly extending flange on an open end thereof which receives the inner tubular member therein.

10. The fluid-conveying device as defined in claim 9, wherein the circumferential portion comprises two spaced-apart flanges extending radially outwardly from the circumferential surface, each flange defining one of the annular side walls.

11. The fluid-conveying device as defined in claim 9, wherein the ring wherein the ring has a circumferential gap extending along part of a circumference thereof, the circumferential gap allowing radial compression of the ring.

12. The fluid-conveying device as defined in claim 9, wherein the ring is made of a material resistant to temperatures of at least 1000° F.

13. The fluid-conveying device as defined in claim 9, wherein the rounded contour defines a radius of curvature, and a ratio between the radius of curvature and the outer diameter of the ring is within the range of 0.2 to 0.8.

14. The fluid-conveying device as defined in claim 9, wherein the ring is monolithic.

15. A bleed air transfer tube assembly for a compressor of a gas turbine engine, the tube assembly comprising:
an inner tubular member having opposed open ends and at least one annular groove defined in an outer surface thereof in proximity of a respective one of the open ends;
an outer tubular member surrounding at least a portion of the inner tubular member where the groove is defined, the outer and inner tubular members being relatively sized such as to allow a range of relative angular displacement therebetween;
one of the inner and outer tubular members is in fluid communication with the compressor; and
a non-elastomeric ring received within the annular groove and having opposed radial surfaces extending adjacent radial walls of the annular groove, an outer surface defining a curve along a longitudinal direction between the opposed radial surfaces and in sealed contact with an inner wall of the outer tubular member, and an inner surface extending within the groove, the inner surface of the ring being spaced apart from a bottom of the groove around at least part of its circumference throughout the range of relative angular displacement, the ring having a radial thickness larger than a radial depth of the groove, such that the outer surface of the ring is in continuous contact with the inner wall of the outer tubular member and prevents contact between the inner and outer tubular members in proximity of the groove throughout the range of relative angular displacement.

16. The bleed air transfer tube assembly as defined in claim 15, wherein the inner tubular member comprises two adjacent spaced-apart flanges extending radially outwardly from a remainder of the inner tubular member and defining the groove therebetween.

17. The bleed transfer tube as defined in claim 15, wherein the ring is made of a material resistant to temperatures of at least 1000° F.

18. The bleed transfer tube as defined in claim 15, wherein the curve of the outer surface defines a radius of curvature, and a ratio between the radius of curvature and an outer diameter of the ring is within the range of 0.2 to 0.8.

19. The bleed transfer tube as defined in claim 15, wherein the ring is monolithic.

20. The bleed transfer tube as defined in claim 15, wherein the ring has
a circumferential gap extending along part of a circumference thereof, the circumferential gap allowing radial compression of the ring.

* * * * *